United States Patent
Hughes et al.

(10) Patent No.: US 7,194,539 B2
(45) Date of Patent: Mar. 20, 2007

(54) METHOD AND SYSTEM FOR DISPLAY OF ACTIVITY OF USERS

(75) Inventors: Ian Hughes, Southampton (GB); Robert Alan Lawrence, London (GB)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 10/289,881

(22) Filed: Nov. 7, 2002

(65) Prior Publication Data

US 2003/0090525 A1 May 15, 2003

(30) Foreign Application Priority Data

Nov. 9, 2001 (GB) .................................. 0126908.3

(51) Int. Cl.
*G06F 15/173* (2006.01)
*G09G 5/00* (2006.01)

(52) U.S. Cl. ...................................... 709/224; 345/156
(58) Field of Classification Search ................ 709/218, 709/224; 345/167, 165, 156
See application file for complete search history.

(56) References Cited

U.S. PATENT DOCUMENTS

| | | | | | |
|---|---|---|---|---|---|
| 4,471,348 | A | * | 9/1984 | London et al. ............... 345/2.2 |
| 5,008,853 | A | * | 4/1991 | Bly et al. .................... 715/751 |
| 5,326,104 | A | * | 7/1994 | Pease et al. .................. 463/18 |
| 5,500,934 | A | * | 3/1996 | Austin et al. ................ 715/853 |
| 5,675,510 | A | | 10/1997 | Coffey et al. ........... 364/514 A |
| 5,682,489 | A | * | 10/1997 | Harrow et al. ............... 715/839 |
| 5,696,702 | A | | 12/1997 | Skinner et al. ......... 364/551.01 |
| 5,768,552 | A | * | 6/1998 | Jacoby ........................ 345/441 |
| 5,848,396 | A | * | 12/1998 | Gerace .......................... 705/10 |
| 5,963,914 | A | | 10/1999 | Skinner et al. ................ 705/11 |
| 5,991,735 | A | * | 11/1999 | Gerace .......................... 705/10 |
| 6,049,334 | A | * | 4/2000 | Bates et al. .................. 715/755 |
| 6,112,083 | A | * | 8/2000 | Sweet et al. ............. 455/426.1 |
| 6,115,680 | A | | 9/2000 | Coffee et al. ............... 702/187 |
| 6,185,514 | B1 | | 2/2001 | Skinner et al. ............. 702/188 |
| 6,195,647 | B1 | * | 2/2001 | Martyn et al. ............ 705/36 R |
| 6,356,859 | B1 | * | 3/2002 | Talbot et al. ................ 702/188 |
| 6,397,167 | B2 | * | 5/2002 | Skinner et al. ............. 702/183 |
| 6,484,143 | B1 | * | 11/2002 | Swildens et al. ............... 705/1 |
| 6,490,620 | B1 | * | 12/2002 | Ditmer et al. .............. 709/224 |
| 6,578,077 | B1 | * | 6/2003 | Rakoshitz et al. .......... 709/224 |
| 6,603,854 | B1 | * | 8/2003 | Judkins et al. ......... 379/265.06 |
| 6,636,585 | B2 | * | 10/2003 | Salzberg et al. .............. 379/22 |
| 6,675,209 | B1 | * | 1/2004 | Britt ........................... 709/224 |
| 6,678,355 | B2 | * | 1/2004 | Eringis et al. ................ 379/22 |

(Continued)

*Primary Examiner*—Saleh Najjar
*Assistant Examiner*—V. Korobov
(74) *Attorney, Agent, or Firm*—Schmeiser, Olsen & Watts; David L. Adour

(57) ABSTRACT

A method and system for the display of the activity of users at a plurality of workstations (108, 110) is provided. The plurality of workstations (108, 110) are grouped in more than one distributed geographical location (102, 104). The disclosed method and system include continuously collecting data from each workstation (108, 110) with the data relating to the activity of a user at the workstation (108, 110). The data from the workstations (108, 110) is compiled in a central database (120) and displayed in a display in the form of an abstract representation (138, 140, 144) of the activity of users at the workstations (108, 110) displayed in real time. The display includes the data from the workstations (108, 110) in the more than one geographical location (102, 104).

18 Claims, 3 Drawing Sheets

U.S. PATENT DOCUMENTS

| | | |
|---|---|---|
| 6,707,904 B1 * | 3/2004 | Judkins et al. .......... 379/265.06 |
| 6,749,510 B2 * | 6/2004 | Giobbi ........................ 463/42 |
| 6,754,699 B2 * | 6/2004 | Swildens et al. ........... 709/217 |
| 6,839,744 B1 * | 1/2005 | Kloba et al. ................ 709/219 |
| 6,847,992 B1 * | 1/2005 | Haitsuka et al. ............ 709/218 |
| 6,934,747 B1 * | 8/2005 | McGrath et al. ............ 709/224 |
| 2001/0003172 A1 | 6/2001 | Skinner et al. ............. 702/187 |

* cited by examiner

METHOD AND SYSTEM FOR DISPLAY OF ACTIVITY OF USERS

FIELD OF THE INVENTION

The present invention relates to a method and system for the display of the activity of users. In particular, the invention relates to the display of the activity of users at a plurality of workstations in more than one geographical location.

BACKGROUND OF THE INVENTION

In a large organisation, there may be more than one geographical location at which members of the organisation are active. The locations may be different building within an organisation's site, different sites within the same town or city, or locations in different countries. A member of an organisation feels the level and type of activity around them in a location but has no concept of whether the level or type of activity is the same at another location. This can result in a problem of a disjointed feeling between different locations of an organisation.

It is beneficial to have some community connectivity between remote locations. This provides a sense of belonging with the other location or locations while a member is physically at one location.

Cameras can be used to show some forms of activity at limited specific locations but do not provide a picture of the overall activity of members of an organisation at more than one location.

The aim of the present invention is to represent activity at more than one remote geographical location. Traditional concepts of time and motion studies may be represented in an abstract form through networked devices on multiple channels. This provides members of the organisation with the sense of belonging to the organisation as a whole. Such representation also enables customers to be shown the organisation at work giving a picture of the dynamics of the whole organisation.

It is known to collect and analyse information relating to the time and work performed on a computer for monitoring the activity of users. U.S. patent application Publication U.S. 2001/0003172 discloses a method and system for such monitoring and analysis of users. The collection of data regarding the use of a computer workstation is carried out on the workstation and the data is stored as an isolated data collection. This document also includes a system for data to be exported from a workstation and used in an estimating algorithm or used in statistical analysis.

SUMMARY OF THE INVENTION

According to a first aspect of the present invention there is provided a method for display of activity of users at a plurality of workstations, the plurality of workstations being grouped in more than one distributed geographical location, the method comprising: continuously collecting data from each workstation, the data relating to the activity of a user at the workstation; compiling the data from the workstations in a central database; displaying the compiled data in a display in an abstract representation of the activity of users at the workstations displayed in real time, the display including the data from the workstations in the more than one geographical location.

The abstract representation may be one of a visual, audio or physical manifestation display. For example, a visual display can be provided on a monitor with user activity represented in different visual forms, an audio representation can be provided by different sounds representing different forms and levels of activity, a physical manifestation display can include a three dimensional model moving in different directions and speed or flows of liquid in a display. It will be appreciated, that the forms of abstract representations are limitless.

Preferably, the display is accessible via a network including the Internet or an intranet. Internet technology may be used to display the data.

A workstation may be a computer interface and the activity may include computer input activity. The computer input activity may include at least one of keyboard strokes, mouse clicks and cursor movement across a screen.

A workstation may also be a device other than a computer, for example, a drinks vending machine, photocopier or corridor location which is monitored for activity. The workstation may be a location and the activity may be movement near the location.

The method may include grouping the data in the display according to at least one of the type of user of the workstation, the location of the workstation, the activity of the user at the workstation. The method may include representing differently each group of data in the display.

According to a second aspect of the present invention there is provided a system for display of activity of users at a plurality of computer interfaces, the plurality of computer interfaces grouped in more than one distributed geographical location, the system comprising: a plurality of computer terminals each with a computer interfaces; each computer terminal having a client application for continuously collecting data relating to the activity of a user of the computer interface; a server for compiling the data from the computer interfaces in a database; means for displaying the compiled data in a display in an abstract representation of the activity of users displayed in real time, the display including the data from the computer interfaces in the more than one geographical location.

The abstract representation may be one of a visual, audio or physical manifestation display.

The means for displaying the compiled data may be in the form of a servlet provided on the server which is accessible via a network. The servlet may be queried frequently by the abstract representation in the form of the visual, audio or physical manifestation.

The activity of a user may include computer input activity including at least one of keyboard strokes, mouse clicks and cursor movement across a screen.

The means for displaying the data may group the data in the display according to at least one of the type of user, the location of the computer interface, the activity of the user at the computer interface. The means for displaying the data may represent each group of data differently in the display.

According to a third aspect of the present invention there is provided a computer program product stored on a computer readable storage medium for display of user activity of users at a plurality of workstations, the plurality of workstations being grouped in more than one distributed geographical location, the computer program product comprising computer readable program code means for performing the steps of: continuously collecting data from each workstation, the data relating to the activity of a user at the workstation; compiling the data from the workstations in a central database; displaying the compiled data in a display in an abstract representation of the activity of users at the workstations displayed in real time, the display including the data from the workstations in the more than one geographical location.

BRIEF DESCRIPTION OF THE DRAWINGS

A preferred embodiment of the invention will now be described in detail by way of example only with reference to the following drawings.

DETAILED DESCRIPTION

Figure 1:
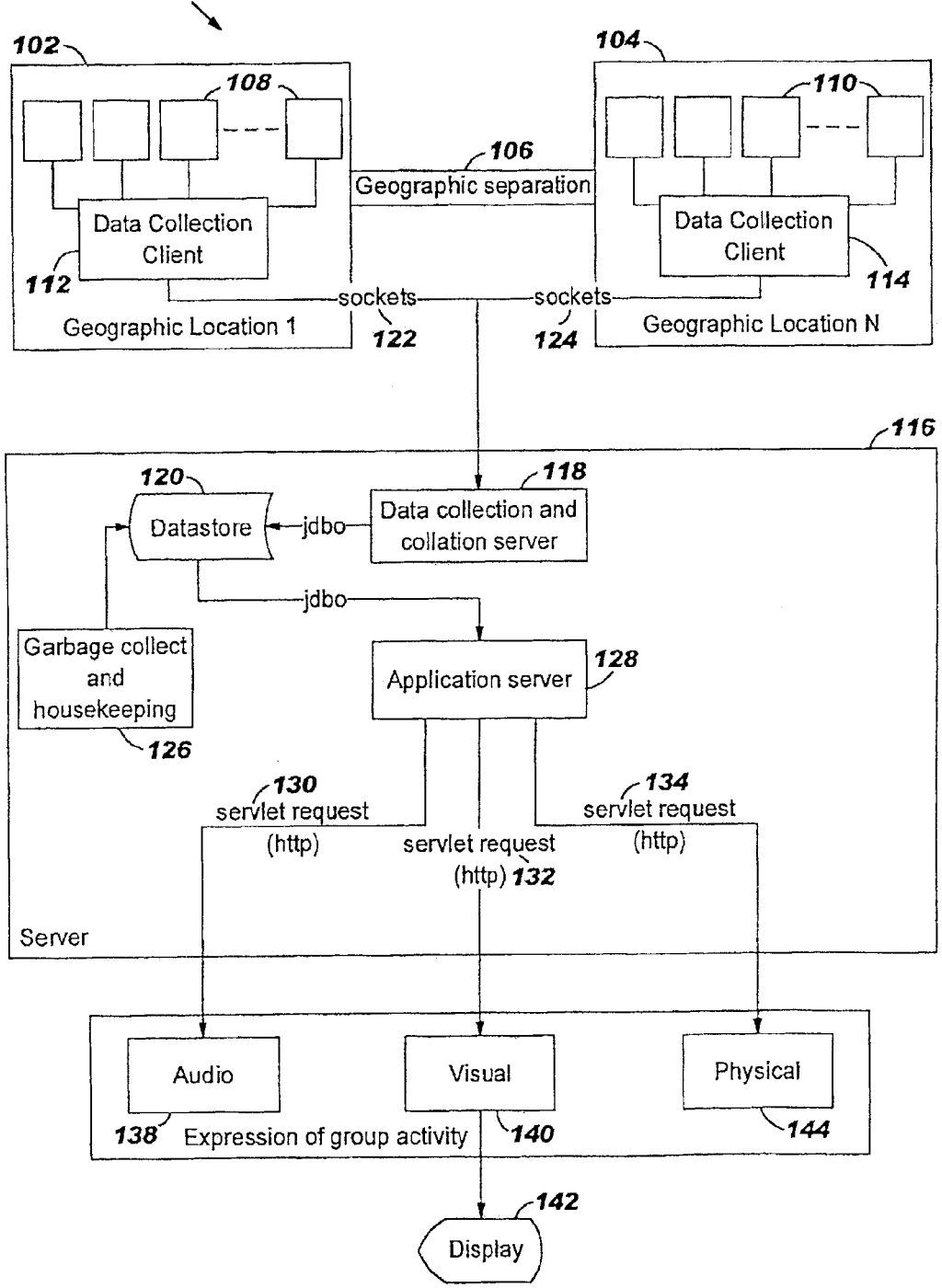
FIG. 1 is a block diagram representation of a system in accordance with the present invention.

Referring to FIG. 1, a system 100 is shown in which there are N locations 102, 104 of an organisation. It will be readily appreciated that any number of geographic locations, from two upwards, could be provided. The locations 102, 104 are separated by distances 106 which may be a few hundred meters, several miles or thousands of miles.

Each of the locations 102, 104 has a plurality of workstations 108, 110 at which users carry out one or more activities regarding which data is collected. For example, the workstations 108, 110 may be computers and the activities carried out by a user may include keyboard strokes, mouse clicks, cursor movement, etc. Other forms of workstation 108, 110 can be included, for example, drinks vending machines, photocopiers, corridor locations, lifts, doorways, pool table etc.

Each workstation 108, 110 has means of collecting data regarding the activity or activities at the workstation 108, 110. For example, each workstation 108, 110 in the form of a desktop or laptop computer may run a small client, for example, written in Delphi. This client collects transparently mouse strokes, key presses, mouse clicks, etc. Each workstation 108, 110 client collates its average rate of data. The client may send the data to a data collection client application 112, 114 for each location 102, 104 or each workstation client may send data directly.

In modern environments most computers in an organisation are connected to a network. The network may be the organisation's intranet or the Internet. Workstations 108, 110 which are in the form of computers can send the collected data continuously via the network to the data collection client 112, 114 for the location 102, 104.

Other forms of workstation 108, 110 such are doorways may be connected to the network if they are operated by an access control system, for example, operated by electronic identity cards. Some workstations 108, 109 may not be connected to the network, for example, photocopier and vending machines, and data may need to be input periodically to the data collection client 112, 114. Alternatively, a computer linkage could be put in place to record the activity at such workstations 108, 110 in real time. Other inputs can be used to capture data such as acoustic pick ups on wooden floors.

Summations, average rates of change or snapshots of collected data from the workstations 108, 110 are continuously sent either direct from the workstation clients or from the data collection clients 112, 114 to a server 116.

The server 116 may be the server for the organisations intranet to which all computer systems in the organisation are connected. Alternatively, the server may be a server for a network to which only nodes with data collection clients 112, 114 are connected.

Each workstation 108, 110 can be attached to a local area network with TCP/IP connectivity, for example, Ethernet. Each workstation 108, 110 has the ability to directly address a data collection and collation application 118 in the server 116. Other possible topologies could include direct connections via MQ Series (Trade Mark of International Business Machines Corporation) or other data connectors. Data could also be placed in common areas on a shared file system and collected by a scheduled process.

The server 116 includes a data collection and collation application 118 with an associated datastore 120 where it stores the data from the workstations 108, 110. The data collection clients 112, 114 at each location 102, 104 are identified on nodes of the network by sockets 122, 124 by the data collection and collation application 118. The data collection and collation server 118 compiles and sorts the data as to which client sent the data and sends it to the datastore 120. The datastore 120 may be a DB/2 (Trade Mark of International Business Machines Corporation) database. An application 126 carries out housekeeping and garbage collection in the datastore 120.

The continuous flow of data is sent from the datastore 120 to a serving application 128. The serving application 128 may be a Websphere Application server which allows any HTTP based application to request the data. Querying of the data is allowed relating to average clicks per second per person through standard web protocols, like HTTP. The data is used by the serving application 128 when a request is made to it by representation clients. At this point the data is combined, for example, a set of values for the last ten most frequent users of the system.

The serving application 128 and the data collection and collation application 118 use a standard Java (Trade Mark of Sun Microsystems, Inc) connector such as jdbc to allow Java to talk to the datastore 120 in the form of a DB/2 database.

The serving application 128 has servlets 130, 132, 134 which are small application programs which run on the server 116 and which display the data which has been compiled from the plurality of workstations 108, 110 in the locations 102, 104.

The servlets 130, 132, 134 or other technology such as a web services interface allow any application to query the data. Multiple servlets can exist to query the data in a suitable form. The following are examples of the use of servlets. One servlet could produce the last top ten usage statistics as a piece of XML (extensible markup language). Another servlet could average every five records over the past hour to produce a list of 20 values. Each servlet would depend on how the data needed to be represented and the display dynamics. This allows also for the tuning of the data flow to ensure that not too much data is retrieved at once or so that trend data can be produced.

Web protocols allow a representation client to make a request from a server and form the basis for the operation of web browsers. The representation client uses a universal resource locator (URL) with additional parameters to request specific version of the data (e.g., request the set of data pertaining to London, key presses normalized to an average rate of 5 clicks per second).

The display is in the form of an expression of group activity 136. The servlets 130, 132, 134 may display the data in audio form 138, visual form 140 on a display means 142, and/or physically 144. The display is an abstract representation of the activity of the users at the workstations 108, 110 at the locations 102, 104. Different activities can be represented differently and the amount of users carrying out an activity can also be represented.

As an example, a visual representation may be a collection of organic cells displayed on screen that gain energy and colour based on the rate of typing and cluster into separate flocks representing different geographic locations of the users carrying out the activity. This and other abstract representations are described further below with reference to FIG. 3.

The users can be categorised by location and by other means such as work departments, etc. However, it is not an aim of the system to provide a data log of the activity of individual identified users.

The servlets 130, 132, 134 can be accessed by users anywhere on a network connected to the server 116. This may include locations 102, 104. The servlets 130, 132, 134 may be accessed via other networks, for example, via the Internet. A user who is not at one of the locations 102, 104 can access the abstract representation of the activity at the locations 102, 104 via the Internet or another form of network.

The data is displayed in the abstract representation of the servlets 130, 132, 134 continuously, in real time, or as near to real time as the processing of the information will allow.

Figure 2:
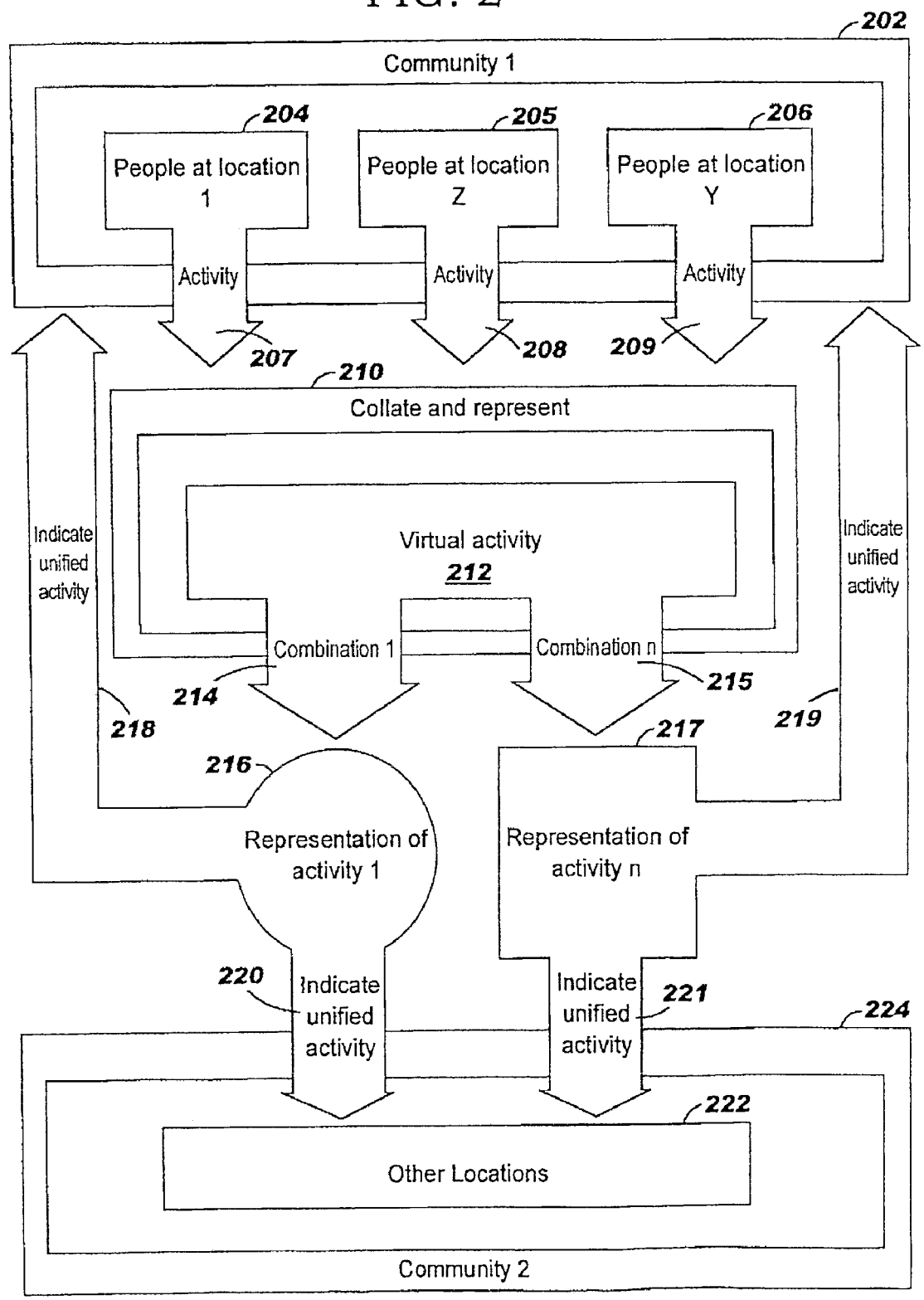
FIG. 2 is a schematic representation of the concept of the method and system of the present invention.

Referring to FIG. 2, a schematic diagram is provided representing the concept of the described method and system. A first location 202 is shown with multiple users at stations 1, 2 and y 204, 205, 206. Each user 204, 205, 206 carries out activities 207, 208, 209. The activities 207, 208, 209 are collated 210 and represented as virtual activities 212. The virtual activities 212 can be sorted into a plurality of different combinations of types of activity, for example, combination of activity 1 to combination of activity n 214, 215 in which all the same activities are combined together regardless of the location of the activities.

The combination of activity 1 is represented in an abstract representation 216 which indicates the unified activity at all the locations and the combination of activity n is represented in an abstract representation 217. The representations 216, 217 of each activity can be accessed 218, 219 by the users 204, 205, 206 at the first location 202. The representations 216, 217 can also be accessed 220, 221 by users 222 at other locations 224.

Figure 3:
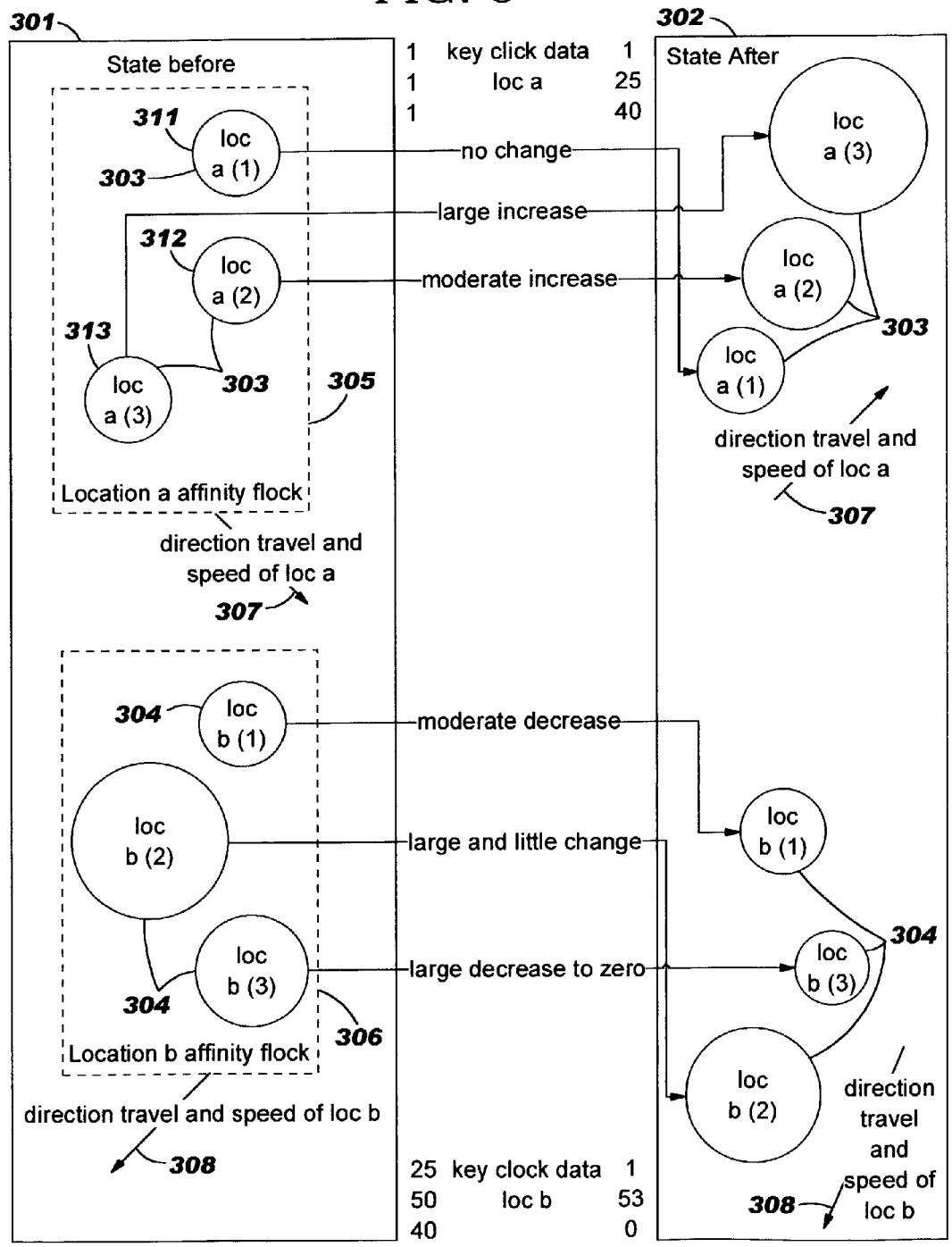
FIG. 3 is a representation of a visual display in accordance with the present invention.

An embodiment of a visual display of an abstract representation of data is illustrated in FIG. 3. The display is an abstract representation of key click data of members at two locations "a" and "b".

A first state 301 at a first time and a second state 302 at a later time are shown. Although two states are shown, in practice the visual representation will go through transition phases. Each of the states 301, 302 includes representations or symbols 303 for members at a first location "a" and symbols 304 for members at a second location "b". The symbols 303 for members of location "a" are grouped together 305 and have an affinity of movement as they all belong to location "a". Similarly, the symbols 304 for members of location "b" are grouped together 306 and have an affinity of movement as they all belong to location "b". Each group 305, 306 of symbols 303, 304 for members has a direction and speed of travel 307, 308 in the first state 301.

The size of each symbol 303, 304 is representative of the number of key clicks of a member in a period of time. In the first state 301, there are three members of location "a" represented by symbols 311, 312, 313 each with one key click in a given period. In the second state 302, the number of key clicks for the three members has changed. The first symbol 311 has not changed as the number of key clicks for the member represented by the symbol 311 has not changed and is still 1. The second symbol 312 has increased in size moderately as the number of key clicks for the member represented by the symbol 312 has increased from 1 to 25. The third symbol 313 has increased in size substantially as the number of key clicks for the member represented by the symbol 313 has increased from 1 to 40. There is an ordinal mapping for input data in that the first number is used to drive symbol 311, the second number is used to drive symbol 312, etc.

The size and energy of each symbol 303, 304 is related to an individual at a location although the symbol is not tied to that individual. The size of the symbol 303, 304 increases if the rate of clicks increases and diminishes if the rate drops. The colour of the symbols 303, 304 can be dependent on the mixture of mouse clicks and keyboard clicks. For example, if a member is only making mouse clicks, the symbol representing that member will be green. If another member is only using a keyboard, the symbol for that member will be blue. All shades between green and blue represent a combination of mouse and keyboard clicks in a given ratio.

The movement 307, 308 of each group 305, 306 of symbols 303, 304 is dependent on the activity of each member in the group 305, 306. The biggest symbol sets the direction that the group follows.

In a different embodiment, another form of representation can be a client program that requests activity and uses aspects of that data to affect the tempo, pitch or style of music being played. One example is to generate ambient tones based on the rate of work of members in locations. A more complex example is to create fast paced rock music or calming mood music utilising samples of real instruments, one stream of data driving the beat, another the melody, another the percussion and so on.

Another embodiment is a client program that collects the sets of mouse stroke x and y coordinates to create a combined swirl visually from the combined data.

A further representation can be provided by the activity of a physical device such as a robot. A robot wirelessly attached to the network can make requests of the data. The robot can operate physical devices based on certain rates being reached or set patterns occurring. For example, if ten members reach four clicks a minute, the robot may physically ring a bell. If all members reach zero clicks a minute, the robot may walk around in patrol mode.

Activities can be visualised across multiple locations and the infrastructure allows for customisable visualisation and audio components to read the data.

This provides a representation of activities of users across a plurality of different locations which may be thousands of miles apart in different countries. In this way, members of an organisation are provided with information as to the level and type of activity in real time being carried out in the organisation as a whole including at the organisations distributed sites. Traditional measurements of time and motion concepts are represented in an artistic and creative manner through networked devices on multiple channels.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications may be made to the foregoing without departing from the scope of the present invention.

The invention claimed is:

1. A method for display of activity of users at a plurality of workstations, the method comprising:
   continuously collecting data from each workstation of the plurality of workstations, each workstation of the plurality of workstations being in a different geographical location, the collected data relating to a rate of computer input activity of at least one user at each workstation;
   compiling the data continuously collected from each workstation in a central database;
   displaying the compiled data in a display in a representation of the rate of computer input activity of the at least one user at each workstation;
   wherein the rate of computer input activity of the at least one user at each workstation comprises the number of input device clicks of each user at each workstation in a given period, and wherein the input device clicks of each user at each workstation are independently selected from the group consisting of key clicks, mouse clicks, and a combination of key clicks and mouse clicks;
   wherein the key clicks are associated with a first color and the mouse clicks are associated with a second color that differs from the first color, wherein the at least one user at each workstation comprises a first user and a second user, wherein the computer input activity of the first user consists of key clicks, wherein the computer input activity of the second user consists of mouse clicks, wherein the representation of the rate of computer input activity of the first user is a first symbol in the first color, and wherein the representation of the rate of computer input activity of the second user is a second symbol in the second color.

2. The method of claim 1, wherein said displaying is performed in real time.

3. The method of claim 1, wherein the first color is green, and wherein the second color is blue.

4. The method of claim 1, wherein the combination of key clicks and mouse clicks is associated with a third color between the first color and the second color such that the third color represents the ratio of the number of key clicks to the number of mouse clicks, wherein the at least one user at each workstation further comprises a third user, wherein the computer input activity of the third user consists of the combination of key clicks and mouse clicks, and wherein the representation of the rate of computer activity of the third user is the third symbol in the third color.

5. The method of claim 1, wherein the plurality of workstations comprises a first workstation and a second workstation, wherein the at least one user at the first workstation consists of a first plurality of users, wherein the at least one user at the second workstation consists of a second plurality of users, wherein said displaying comprises displaying the representation of the rate of computer input activity of the first and second plurality of users in a first display for a first period followed by displaying the representation of the rate of computer input activity of the first and second plurality of users in a second display for a second period that ends after the first period ends.

6. The method of claim 5, wherein the representation of the rate of computer input activity of each user of the first and second plurality of users in each period of the first period and second period is a symbol whose size is an increasing function of the number of input device clicks of each user in the first period and second period, respectively.

7. The method of claim 6, wherein the input device clicks of each user of the first and second plurality of users in each period of the first period and second period consist of key clicks.

8. The method of claim 7, wherein the number of key clicks of each user of the first plurality of users in the first period is a same number of key clicks, and wherein the number of key clicks of two users of the second plurality of users in the first period are different numbers of key clicks.

9. The method of claim 7, wherein the number of key clicks of a user of the first plurality of users in the second period differs from the number of key clicks of the user of the first plurality of users in the first period, and wherein the number of key clicks of a user of the second plurality of users in the second period differs from the number of key clicks of the user of the second plurality of users in the first period.

10. The method of claim 7, wherein the number of key clicks of a first user of the first plurality of users in the second period differs from the number of key clicks of the first user of the first plurality of users in the first period, and wherein the number of key clicks of a second user of the first plurality of users in the second period and the number of key clicks of the second user of the first plurality of users in the first period is a same number of key clicks.

11. The method of claim 1, wherein the rate of computer input activity of the at least one user at each workstation comprises a visual swirl representing X and Y coordinates traced by mouse cursor movement across a screen.

12. The method of claim 1, wherein the plurality of workstations comprises workstations in different countries.

13. A system, comprising a server adapted to implement the method of claim 1, said server being coupled to the plurality of workstations.

14. A computer program product stored on a computer readable storage medium, the computer program product comprising computer readable program code for performing the method of claim 1.

15. A method for display of activity of users at a plurality of workstations, the method comprising:
    continuously collecting data from each workstation of the plurality of workstations, each workstation of the plurality of workstations being in a different geographical location, the collected data relating to a rate of computer input activity of at least one user at each workstation;
    compiling the data continuously collected from each workstation in a central database;
    displaying the compiled data in a display in a representation of the rate of computer input activity of the at least one user at each workstation;
    wherein the rate of computer input activity of the at least one user at each workstation comprises the number of input device clicks of each user at each workstation in a given period, and wherein the input device clicks of each user at each workstation are independently selected from the group consisting of key clicks, mouse clicks, and a combination of key clicks and mouse clicks;
    wherein the representation of the rate of computer input activity of the at least one user is a symbol whose size is an increasing function of the number of input device clicks of each user in the given period.

16. The method of claim 15, wherein the symbol is a circle.

17. A system, comprising a server adapted to implement the method of claim 15, said server being coupled to the plurality of workstations.

18. A computer program product stored on a computer readable storage medium, the computer program product comprising computer readable program code for performing the method of claim 15.

* * * * *